US008566443B2

(12) United States Patent
Tola et al.

(10) Patent No.: US 8,566,443 B2
(45) Date of Patent: Oct. 22, 2013

(54) UNOBTRUSIVE METHODS AND SYSTEMS FOR COLLECTING INFORMATION TRANSMITTED OVER A NETWORK

(75) Inventors: Kenneth Tola, Los Angeles, CA (US); Earl Grant-Lawrence, Pearland, TX (US)

(73) Assignee: DataTrendz, LLC, Westfield, NJ (US)

( * ) Notice: Subject to any disclaimer, the term of this patent is extended or adjusted under 35 U.S.C. 154(b) by 0 days.

(21) Appl. No.: 13/301,398

(22) Filed: Nov. 21, 2011

(65) Prior Publication Data

US 2012/0239774 A1    Sep. 20, 2012

Related U.S. Application Data

(63) Continuation of application No. 12/103,619, filed on Apr. 15, 2008, now abandoned.

(60) Provisional application No. 60/912,203, filed on Apr. 17, 2007.

(51) Int. Cl.
*G06F 13/00* (2006.01)

(52) U.S. Cl.
USPC .......................... 709/224; 709/219; 709/225

(58) Field of Classification Search
USPC .................. 709/217, 219, 223, 224, 225, 250
See application file for complete search history.

(56) References Cited

U.S. PATENT DOCUMENTS

| 5,317,571 | A | | 5/1994 | Marcel |
| 6,018,619 | A | | 1/2000 | Allard et al. |
| 6,052,730 | A | * | 4/2000 | Felciano et al. ............. 709/225 |
| 6,728,767 | B1 | | 4/2004 | Day et al. |
| 6,877,007 | B1 | * | 4/2005 | Hentzel et al. ............... 709/224 |
| 7,020,719 | B1 | | 3/2006 | Grove et al. |
| 7,024,477 | B2 | * | 4/2006 | Allan ........................... 709/224 |
| 7,080,158 | B1 | | 7/2006 | Squire |
| 7,085,817 | B1 | | 8/2006 | Tock et al. |
| 7,376,722 | B1 | | 5/2008 | Sim et al. |
| 7,464,187 | B2 | * | 12/2008 | Glommen et al. ............ 709/250 |
| 7,562,153 | B2 | | 7/2009 | Biliris et al. |
| 2003/0050920 | A1 | | 3/2003 | Sun |
| 2003/0051026 | A1 | | 3/2003 | Carter |
| 2003/0126248 | A1 | | 7/2003 | Chambers |
| 2004/0111492 | A1 | | 6/2004 | Nakahara et al. |
| 2005/0015510 | A1 | | 1/2005 | Rhee |
| 2005/0144242 | A1 | | 6/2005 | Marston et al. |

(Continued)

OTHER PUBLICATIONS

Wessels, Web Caching, Chapter 5—Interception Proxying and Caching, O'Reilly Online Catalog, Jun. 2001.

*Primary Examiner* — Viet Vu
(74) *Attorney, Agent, or Firm* — Conley Rose, P.C.

(57) ABSTRACT

The present invention relates generally to unobtrusive methods and systems for collecting information transmitted over a network utilizing a data collection system residing between an originator system and a responding system. In one embodiment the Originator System can be a web browser and the Responding System can be a web server. In another embodiment the Originator System can be a local computer and the Responding System can be another computer on the network. Both these and other configurations are considered to be within the domain of this invention. The Data Collection System acts in a hybrid peer-to-peer/client-server manner in responding to the Originating System as a Responding System while acting as an Originating System to the Responding System. This configuration enables real-time acquisition and storage of network traffic information in a completely unobtrusive manner without requiring any server- or client-side code.

21 Claims, 12 Drawing Sheets

(56) References Cited

U.S. PATENT DOCUMENTS

| | | |
|---|---|---|
| 2005/0272405 A1 | 12/2005 | Tomlinson et al. |
| 2009/0013089 A1 | 1/2009 | Sullivan et al. |
| 2009/0259666 A1 | 10/2009 | Tola et al. |

* cited by examiner

| IN MEMORY XML FILE ||
|---|---|
| Sub-Domain | Target URI |
| SD value (Target Domain a) | Target URI a |
| SD value (Target Domain b) | Target URI b |

UNOBTRUSIVE METHODS AND SYSTEMS FOR COLLECTING INFORMATION TRANSMITTED OVER A NETWORK

PRIORITY CLAIM

This application is a continuation of U.S. patent application Ser. No. 12/103,619 filed Apr. 15, 2008 now abandoned, which claims priority from earlier filed U.S. Provisional Patent Application Ser. No. 60/912,203 filed Apr. 17, 2007. The foregoing applications are hereby incorporated by reference in their entirety as if fully set forth herein.

FIELD OF THE INVENTION

The present invention relates generally to unobtrusive methods and systems for collecting information transmitted over a network.

BACKGROUND OF THE INVENTION

Data collection solutions can generally be separated into two general approaches. The first approach, called server-side, loads software onto the customer's server, for example, packet "sniffing" software and log file analysis software. This software collects many of the more common usage statistics and is very beneficial in storing the method used to transmit data. The second approach focuses on placing code on the client's computer to capture client interactions with a remote site. These client-side data collection solutions take a variety of forms. Examples of client-side data collection solutions include code inserted on a page and text files (also known as "cookies") which are stored on the client's machine.

Unfortunately, both approaches suffer a number of drawbacks that make them nonviable options for comprehensive, unobtrusive data collection. One major drawback of these approaches is that code has to be installed either on the customer's server, in the former case, or on the client's machine as in the latter case. Software compatibility issues, tracked solution growth constraints and customer/client time usage issues are all exacerbated by this requirement. These approaches also limit the usefulness or utility of a tracked network-enabled solution. In the server-side approach, many tracking approaches use cached components and they cannot support complex client-side interactions that form the basis of a significant number of network-enabled solutions. The client-side approach, on the other hand, cannot adequately handle new interactions between the client and the server as they rely on static usage patterns to infer user activity. Finally, there is a growing need to track clients across related service offerings and this capability is beyond the scope of server-side solutions and only possible on client-side solutions through the use of third-party utilities which are disabled by default in most modern systems. For example, in the case of website tracking, the only means available for these types of tracking system to persist across multiple websites is to utilize $3^{rd}$ party cookies. Modern web browsers deny the ability to use such cookies by default.

Contextual Information

One of the other major shortcomings with the prior solution approaches is the lack of context-dependent data. In order to understand this concept, the example of brain-imaging will be examined. In older Positron Emission Topography (PET) scanning methods radioactive material was used to track brain function in humans. This approach would provide colorful images of brain activity, however there was no structure and thus doctors could not determine what part of the brain was responsible for the observed activity.

Another older technology—Magnetic Resonance Imaging (MRI) was very good at imaging three-dimensional tissue structure and was often used to look for concentrated tissue such as tumors or clots. Despite this high resolution imaging, MRI did not provide function and thus it was still very difficult to determine what area may or may not be damaged.

In 1991 these two approaches were combined into what is now called Functional Magnetic Resonance Imaging (fMRI). This technique overlays function on top of structure and it has led to an evolution in neuro-imaging diagnostics. The ability to see exactly what structure is performing what activity is a key component for properly determining activity.

The foregoing is merely a rough conceptual analogy from a totally unrelated technology area, but it is nevertheless particularly useful in understanding the current tracking industry. On the one side, modern tracking solutions capture client interactions (or function) to varying degrees of accuracy. However these tracking solutions are unable to capture the structure of a targeted system during these interactions.

On the other side, various crawlers are capable of providing detailed structure of thousands of networked solutions every day but none are capable of capturing client interactions.

Without the ability to relate the structure of a network site to the client interactions—what is termed here as contextual information—the ability to understand website function is significantly impaired or diminished.

The inventors have recognized the drawbacks mentioned above and have provided systems and methods for collecting information transmitted over a network which, among other things, overcome the disadvantages recited above.

BRIEF DESCRIPTION OF THE DRAWINGS

These and other objects, features and advantages of the invention will be apparent from a consideration of the following Detailed Description of the Invention considered in conjunction with the drawing Figures, in which:

FIG. 6 illustrates a conceptual URI look-up table.

DETAILED DESCRIPTION OF THE INVENTION

Figure 1:
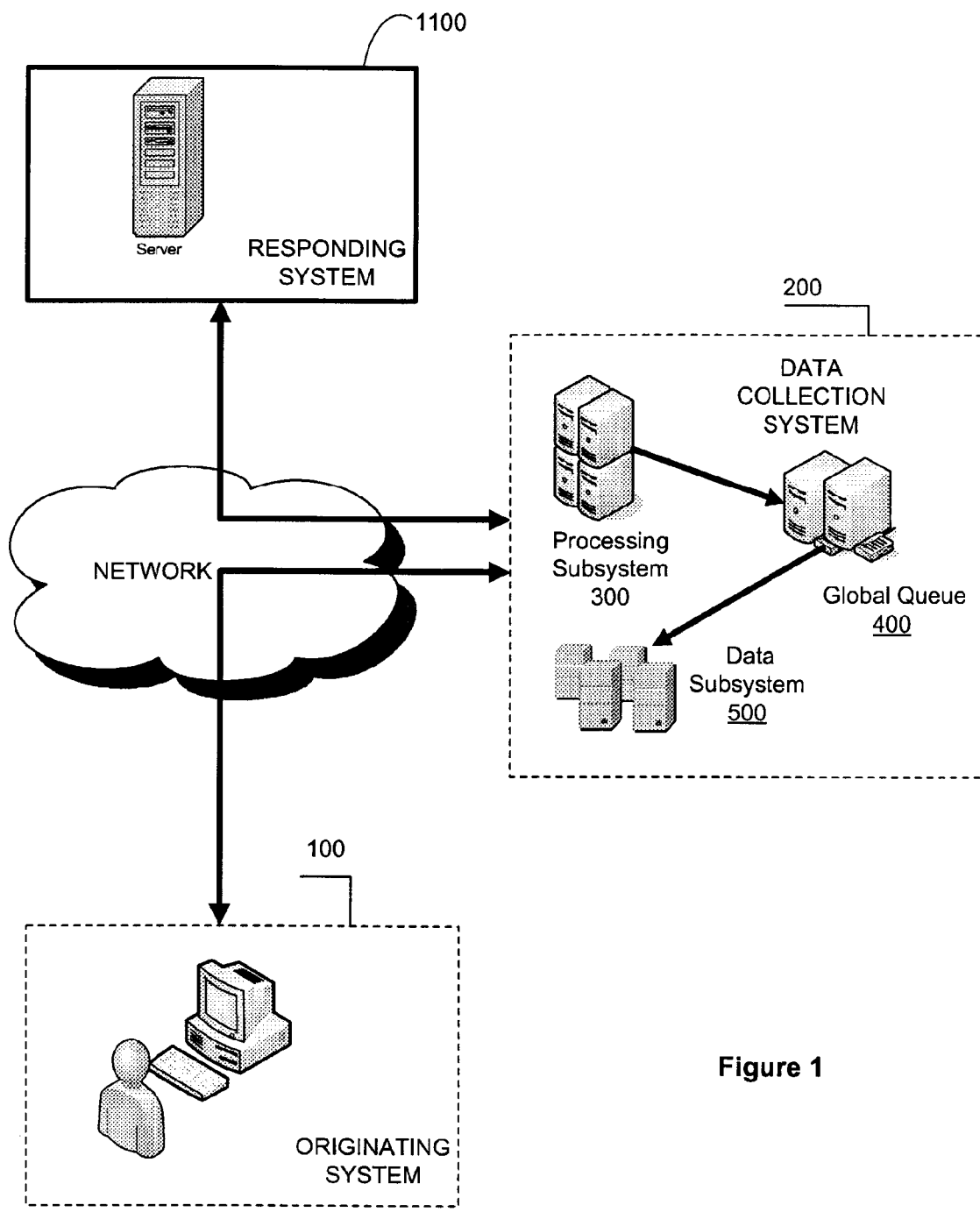
FIG. 1 is a block diagram of a data collection system configuration in accordance with an embodiment of the invention.

Preferred embodiments of the invention provide a data collection system configurable to communicate with an originator system acting in the role of a responding system. The information sent from the originator system can be stored for subsequent use and then utilized to generate a request based on the context of the originating system request. The data collection system then acts in the role of the originator system and submits a request to the responding system via a network. The originating message (request) includes a first Universal Resource Indicator (URI) that can be used to determine a responding system URI based at least in part on dynamic URI mappings. The responding system can then return a response to the data collection system and this response can be both stored and used to generate a response back to the originator system. This information can then be utilized to support advanced user interaction analytics with monitored network-enabled sites.

In accordance with one preferred embodiment, sometimes referred to hereinafter as DataTrendz™, there are provided herein methods and systems for tracking messages transmitted over a network. The ability of DataTrendz™ to interject processing directly into the request-response stream allows users to store and/or analyze, for the first time, both structure and function. Collecting this context-dependent data will provide significant new insights that scale beyond simple tracking and reporting. The utility and functionality provided by DataTrendz™ is achievable for a network, such as the Internet, having a broad range of differing network locations. In this example network locations may include network servers, website servers, personal computers, mobile devices such as phones capable of accessing the Internet and a host of other network capable devices. However, DataTrendz™ also provides preferred functionality and utility to other networks such as private intranets where the range of network locations may be more homogenous than that found on the Internet. Therefore, a specific implementation of DataTrendz™ can include virtually any type of network connecting virtually any type of network location to virtually any other type of network location.

DataTrendz™ resolves the numerous challenges limiting current tracking approaches while expanding the concept of traffic tracking and analysis beyond the restrictions on network-based traffic.

Website Specific Benefits

Within the website-domain, DataTrendz™ provides many benefits such as (but not limited to):

Code Intensive. Issue: Many data collection solutions require extensive amounts of code on client or customer machines. Solution: The system and method of DataTrendz™ do not require code on either the client or customer machines.

Antiquated Inference Methods. Issue: Classic server processing usage patterns, utilized by many tracking solutions to determine a lead, are no longer valid given new technical approaches to methods for processing originating requests. Solution: DataTrendz™ captures the actual lead information as part of its contextual data collection process, making the concept of determining function through inference, or at least solely or primarily through inference, obsolete.

Cross Domain Issues. Issue: Without resorting to third-party cookies, classic data collection solutions have no means of tracking users across websites. Solution: Since DataTrendz™ acts as an unobtrusive tracking system, it is capable of tracking across an unlimited number of websites without the use of cookies, or any other customer/client-side code.

Caching. Issue: Some data collection solutions send cached versions of a customer's website in response to an originating request. This approach cannot support complex websites with advanced client-side functionality. Solution: When utilizing an unobtrusive tracking system, no caching is required. In addition, by operating at the socket level, the dynamic requesting, parsing and HTML package creation is as fast as any other network hop in a request chain.

Browser Agnostic. Issue: Using client-side JavaScript or server-side frames—as is the case in current data collection approaches—can lead to browser-dependency issues. Solution: DataTrendz™ does not require anything to be placed on the client's browser that would affect the user interface, therefore there are no browser issues related to this tracking approach.

FIG. 1 illustrates a network including a Data Collection System 200. The Data Collection System 200 manages messages sent to and from the Originator System 100 and the Responding System 1100. In one embodiment of the invention, the network comprises the Internet in either a wired, wireless cellular or other medium. In another embodiment of the invention, the network is selected from the group comprising: local area network (LAN) and wide area network (WAN). The invention is not limited to implementation in any specific network configuration. Instead, it will find application in any type of system comprising interconnected computers configured to communicate with each other using electronically transmitted messages.

In one embodiment of the invention the Processing Subsystem 300, Global Queue Subsystems 400 and Data Subsystem 500 can exist in separate physical devices or groups of devices. In another embodiment, these subsystems can reside in the same device or in any combination therein.

In one embodiment network traffic at the level of a device driver could be re-routed based on in-memory rules to a resulting URI address. Utilizing this software-based, DNS-related routing system, DataTrendz™ has the ability to use any domain name externally and route that traffic to a desired internal location without requiring separate URI values. This embodiment can be used to balance traffic to known processing locations either in a symmetric or fixed manner by utilizing processing locations across the same server, local area network, broad area networks or any combination therein.

In a preferred embodiment of the invention an Originator System sends a request using a Domain Name Source (DNS) Uniform Resource Identifier (URI). This URI passes the message to a Geographic Load Balancer 201 on a primary path denoted using a solid path line from the Originator System 100 to the Geographic Load Balancer 201. The URI is provided as a current example of locating external resources and is not intended to restrict the present invention.

Figure 2:
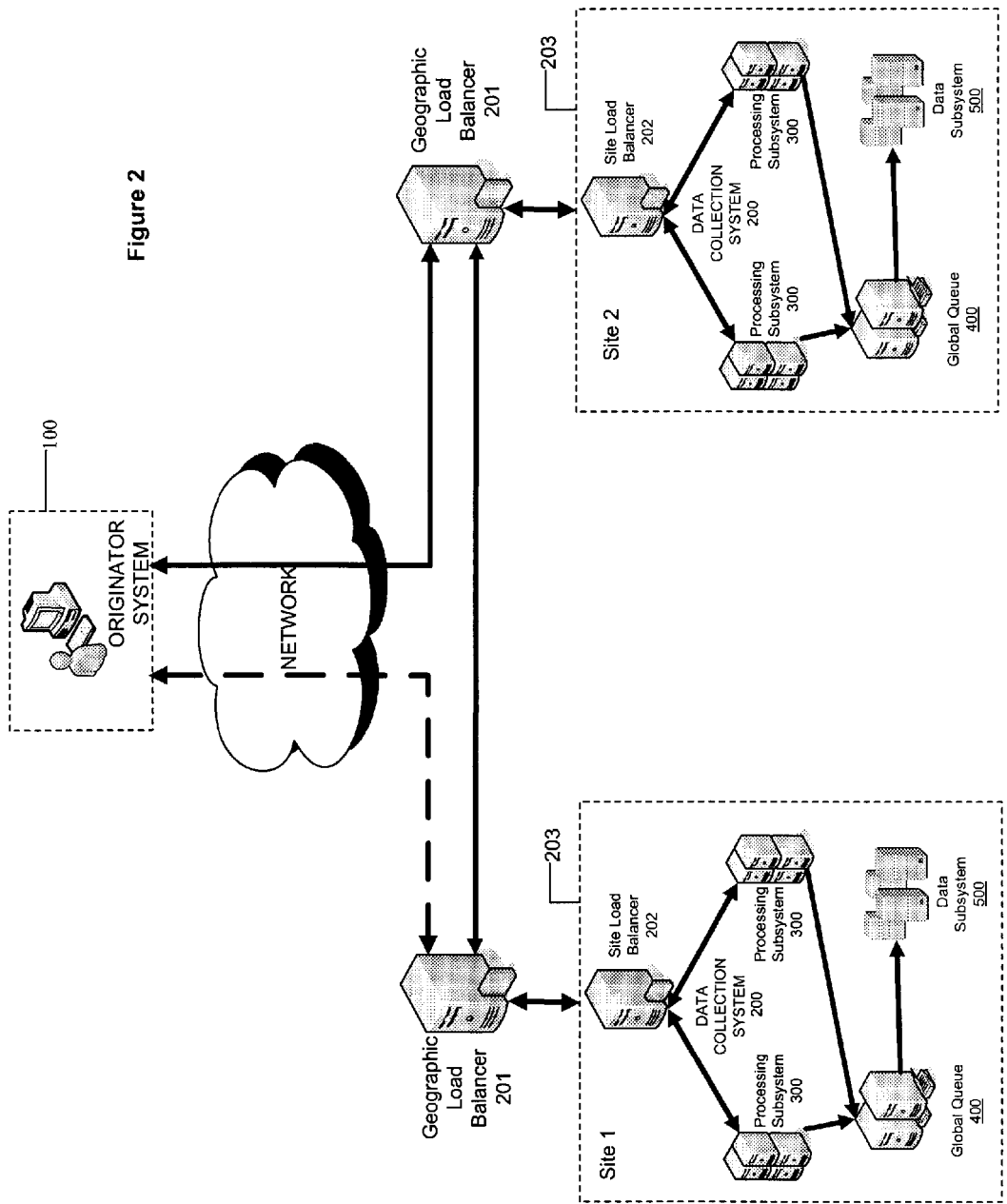
FIG. 2 is a block diagram of the network configuration in accordance with an embodiment of the invention.

There can be as many, or even no, Geographic Load Balancers 201 as required in order to ensure full availability and two are shown for explanatory purposes. In this embodiment the Geographic Load Balancers 201 communicate with one another in order to ensure that each Site 203 is running properly and to balance load across regions. If the primary Geographic Load Balancer 201 fails to respond to a user request, the DNS protocol will automatically failover to a secondary Geographic Load Balancer 201 as denoted with the dotted line in FIG. 2. Domain Name System (DNS) is provided as an example of currently implemented means of identifying external resources and it is not intended as a restriction for this invention. This failover process will continue for as many Sites 203 as are provide in the implementation of a given embodiment.

Within a Site 203, a Site Load Balancer is utilized in order to maintain functionality between one or more Processing Subsystems 300. If a given Processing Subsystem 300 fails, all traffic will be diverted to the remaining Processing Subsystems. If all Processing Subsystems within a Site 203 are not processing, the Site Load Balancer 202 will return the message to the Geographic Load Balancer 201 for processing at another Site 203.

In a preferred embodiment of the invention, Data Collection System 200 comprises a server configured to communicate with an Originator System 100 and a Responding System 1100. The Data Collection System 200 dynamically monitors messages transmitted from the Originator System 100 intended for the Responding System 1100 and vice versa. To accomplish this, the Data Collection System 200 includes a Port Monitor 301 within the Processing Subsystem 300 as illustrated in FIG. 3.

Figure 3:
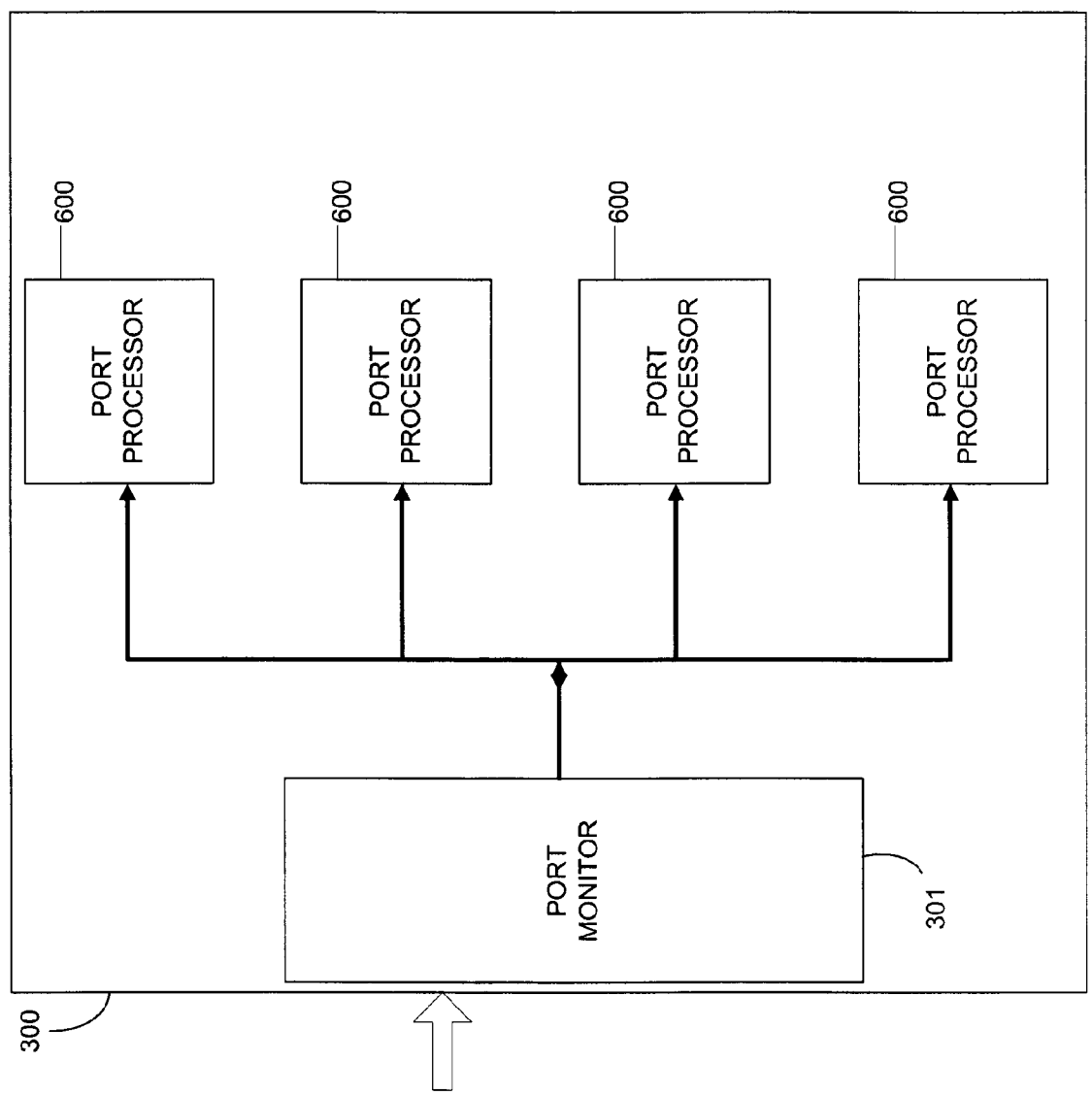
FIG. 3 is a block diagram of port forwarding according to an embodiment of the invention.

As shown in FIG. 3, when a Port Monitor 301 receives a Request, that Request is port forwarded to one of a plurality of Port Processors 600. In one embodiment, there is only one Port Processor 600, in another embodiment there is a plurality of Port Processors 600. In one embodiment the one or more Port Processors 600 exist one on physical device, in another embodiment one or more Port Processors exist on any combination of separate devices. All embodiments are considered to be within the scope of this invention.

Figure 5:
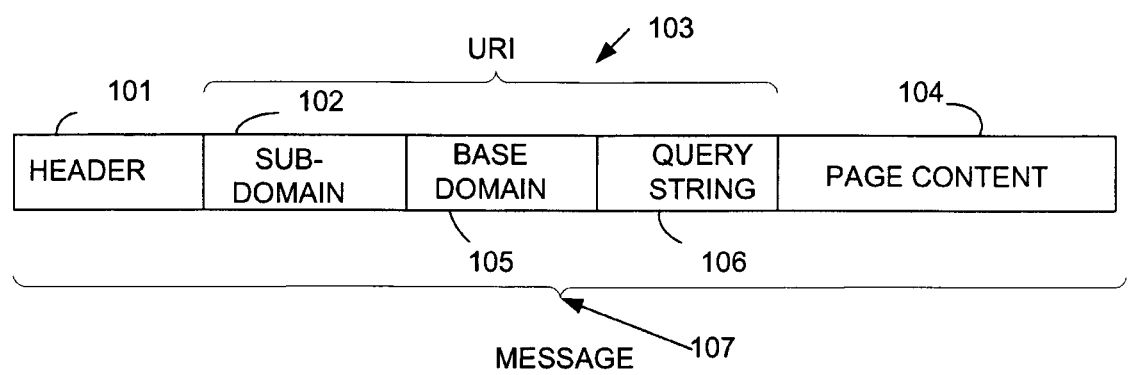
FIG. 5 illustrates a general message format.
Figure 6:
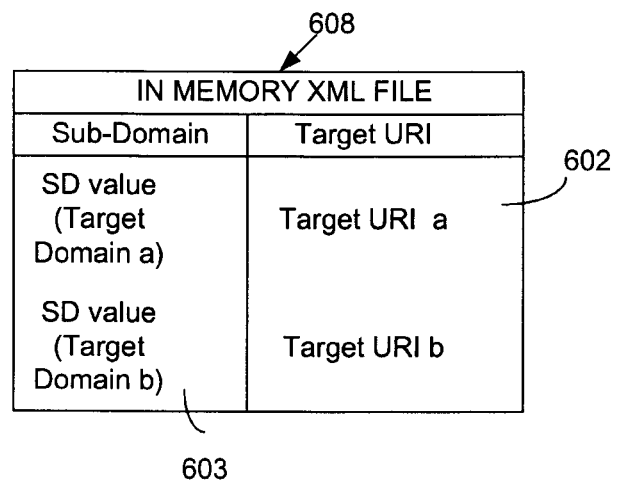

Port Processor 600 includes a Data Representation 601 which contains mappings between Sub-Domain (SD) values 102 and their corresponding responding Uniform Resource Identifiers (URIs) 103 as illustrated in FIG. 5. In a preferred embodiment of the invention, a map comprises an in-memory XML File 608 as shown in FIG. 6. The in-memory XML File 608 illustrated in FIG. 6 is a conceptual representation. As such, it does not indicate a specific number of entries, nor does it indicate all details of the entries. Exact implementations of the Data Representation 601 vary. All of the variations are intended to remain within the scope of the invention.

Data Representation 601 comprises Sub-Domain values 102. Each Sub-Domain entry includes a value representing a corresponding responding domain and a target URI. Corresponding URIs are indicated in FIG. 6. A URI is one means used used to identify a Responding System 1100. In accordance with a preferred embodiment of the invention, a plurality of Responding Systems 1100 of a network is mapped to corresponding unique Sub-Domain values 102 in FIG. 6. A mapped value for a Responding System 1100 Sub-Domain 102 is referred to herein as a "Responding Domain".

In a preferred embodiment of the invention, the map comprises an in-memory XML File 608 comprising URI's 103. In another embodiment of the invention, the map comprises an XML file comprising responding system Universal Resource Locators. In a preferred embodiment of the invention, the map is stored in a memory of the Data Collection System 200. In another embodiment of the invention, the map is stored in a memory of the Port Processor 600.

FIG. 5 illustrates a general message configuration representative of a type commonly used to communicate via the Internet. Message 107 comprises a Header portion 101, a URI portion 103 and a Page Content portion 104. URI portion 103 comprises a Sub-Domain portion 102, a Base Domain portion 105 and a Query String portion 106. This message is provided as a reference and all combinations or derivatives of this message are considered to be within the domain of this invention, and in preferred embodiments, these messages (and their combinations and derivatives) can enable the inclusion of header information and content.

Processing Subsystem 300

Figure 4:
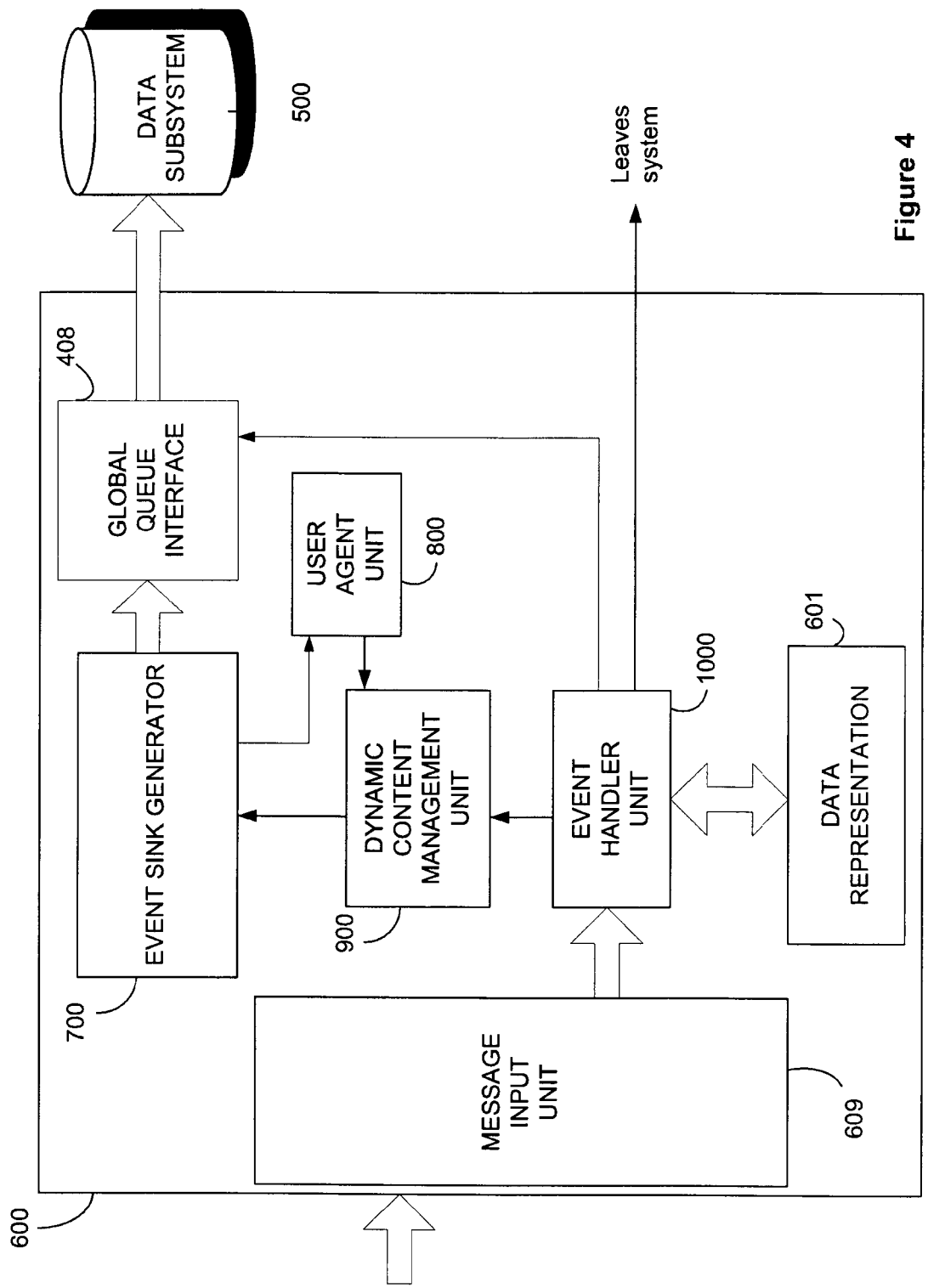
FIG. 4 is a block diagram of a controller according to an embodiment of the invention.

FIG. 4 illustrates a Processing Subsystem 600 of the Data Collection System 200 illustrated in FIG. 1 according to a preferred embodiment of the invention. The Processing Subsystem 300 comprises a Port Monitor (PM) 301 which forwards traffic to one or more Port Processors 600. A Port Processor 600 consists of a Dynamic Content Management Unit (DCMU) 900, an Event Sink Generator (ESG) 700, a Global Queue Interface 408, an Event Handler Unit (EHU) 1000, Data Representation 601, and a User Agent (UA) 800. The Processing Subsystem 600 also communicates with the Global Queue 400 via the Global Queue Interface 408.

Port Monitor 301

A Port Monitor 301 is configured to sense data streams comprising communication over a network. A Port Monitor monitors one or more ports (e.g. port 80, 81, etc.) of Data Collection System 200 to detect network communications traffic. One example of network communications traffic is a message transmitted from an Originator System 100 (illustrated in FIG. 1) for information, for example a web page, provided by a Responding System 1100. This communication traffic can be secured or unsecured; wired, wireless or cellular or any other form of communication between two devices on any type of network.

According to a preferred embodiment of the invention, the Originator System 100 comprises a user computer. An example of a message from a user computer is a request by a user via an Originator System 100 for a web page provided by a Responding System 1100. The user's request can be directed to a server comprising Data Collection System 200. Note the user's request preferably terminates at Data Collection System 200 though the information requested by the user resides on Responding System 1100. The Port Monitor 301 can detect the network traffic and communicates that information to one or more Port Processors 600 in a load-balanced manner.

Port Processor 600

The Port Processor 600 generates a Request Message in response to a user request detected by the Port Monitor 301. The Port Processor 600 request can be transmitted to a target Responding System 1100, preferably as determined by the mapping found in the Data Representation 601. Responding System 1100 responds to requests from the Port Processor 600 in a synchronous manner. Responding System 1100 directs its responses to the Data Collection System 200 which is captured by the Port Monitor 301 and forwarded to the same Port Processor 600.

Event Handler Unit (EHU) 1000

Within the Port Processor 600, the EHU 1000 is configured to communicate with the Message Input Unit 609, the DCMU 900, a Data Representation of URI mapping 601 and the Global Queue Interface 408. EHU 1000 carries out a process referred to herein as Event Message Handling. The first step is to parse the subdomain from the incoming URI and to perform a look-up query from the Data Representation 601. If the look-up results in a responding domain, then the incoming request and the responding domain are passed to the DCMU 900 and Global Queue Interface 400 by EHU 1000. If the look-up does not result in a responding domain, the request is passed directly to the Responding System 1100 thereby by-passing data collection and storage mechanisms of Data Collection System 200.

Figure 7:
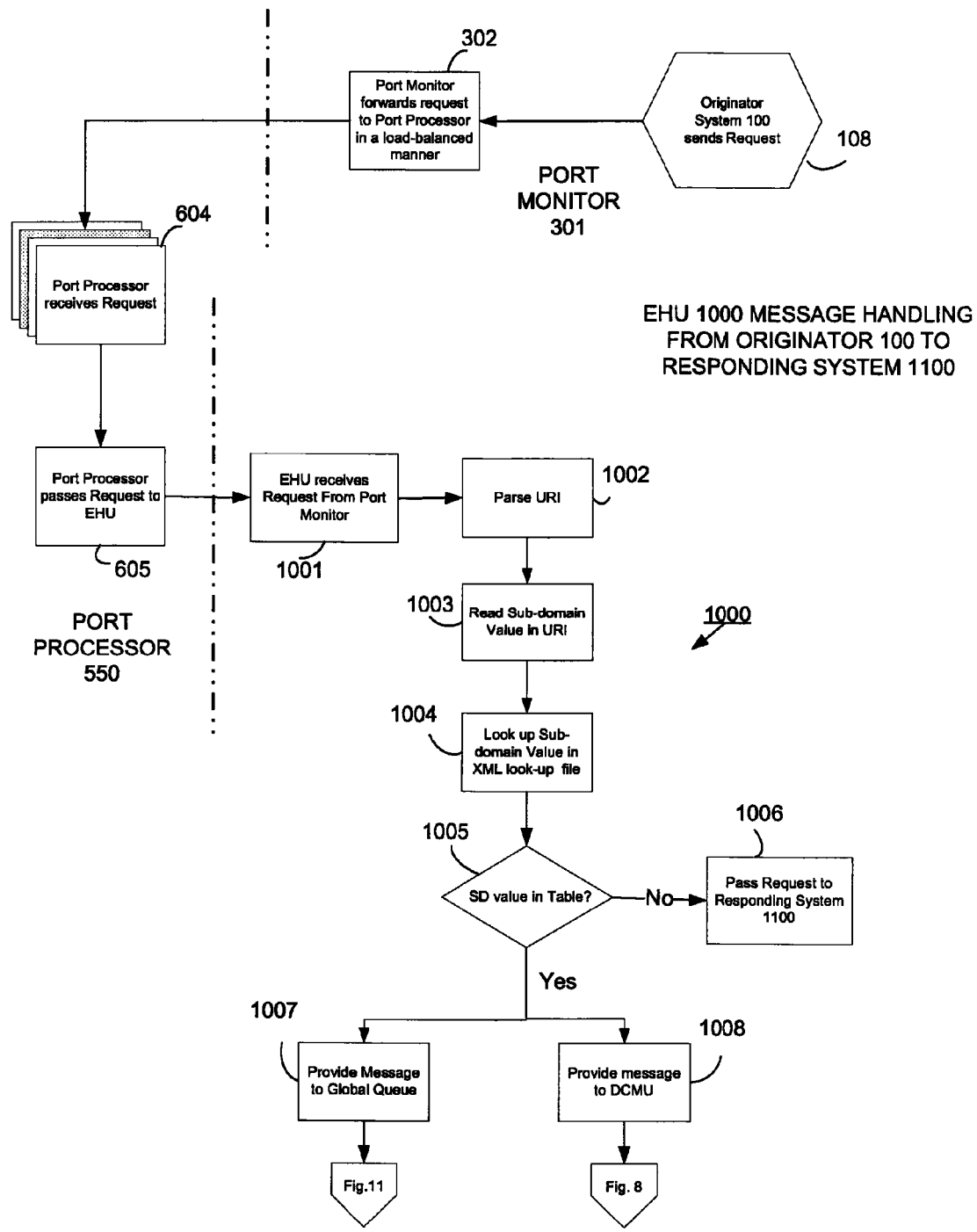
FIG. 7 is a flow chart illustrating event handling steps for a message transmitted from an originating system to a responding system in accordance with an embodiment of the invention.

For a request from an Originator System 100 for information from a Responding System 1100, EHU 1000 is configured to carry out the method illustrated in FIG. 7. In that case an Originator System 100 sends a request as indicated at 108 of FIG. 7 and a Port Monitor 300 receives the request as indicated at 302 of FIG. 7. For a response from a Responding System 1100 providing information requested by a Port Processor 600, EHU 1000 is configured to carry out the method illustrated in FIG. 9. In that case a Responding System 1100 sends a response as indicated at 1101 of FIG. 9. A Port Monitor 301 receives the response as indicated at 303 of FIG. 9.

Referring to FIG. 7 the Message Input Unit 609 receives the Message 107 from the Port Monitor 301 as shown in step 605. The EHU 1000 receives from the Port Processor 600 a message representing a request from an Originating System 100. In a preferred embodiment of the invention, the request comprises a message of the general type illustrated in FIG. 5 at 107. EHU 1000 can evaluate the received request by parsing URI 103 of Message 107 to identify a Sub-Domain 102 value (steps 1001-1003 of FIG. 7). EHU 1000 determines if Sub-Domain 102 of Message 107 corresponds to a monitored Sub-Domain 102 value. A monitored Sub-Domain 102 value is a value assigned by Data Collection System 200 for a Responding System 1100.

If EHU 1100 determines the Sub-Domain 102 value in the URI 103 is a monitored Sub-Domain 102 (step 1005 of FIG. 7) EHU 1100 sends the Message 107 to Dynamic Content Management Unit (DCMU) 900 (FIG. 7 at step 1007). In addition EHU 1100 provides the Message 107 to Global Cache 400 (FIG. 7 at step 1008.) EHU 1100 makes the determination based on the value of the responding domain. If the Responding System 1100 URI 103 is not in the Data Representation 601, EHU 1100 passes the message to the Responding System 1100.

Figure 9:
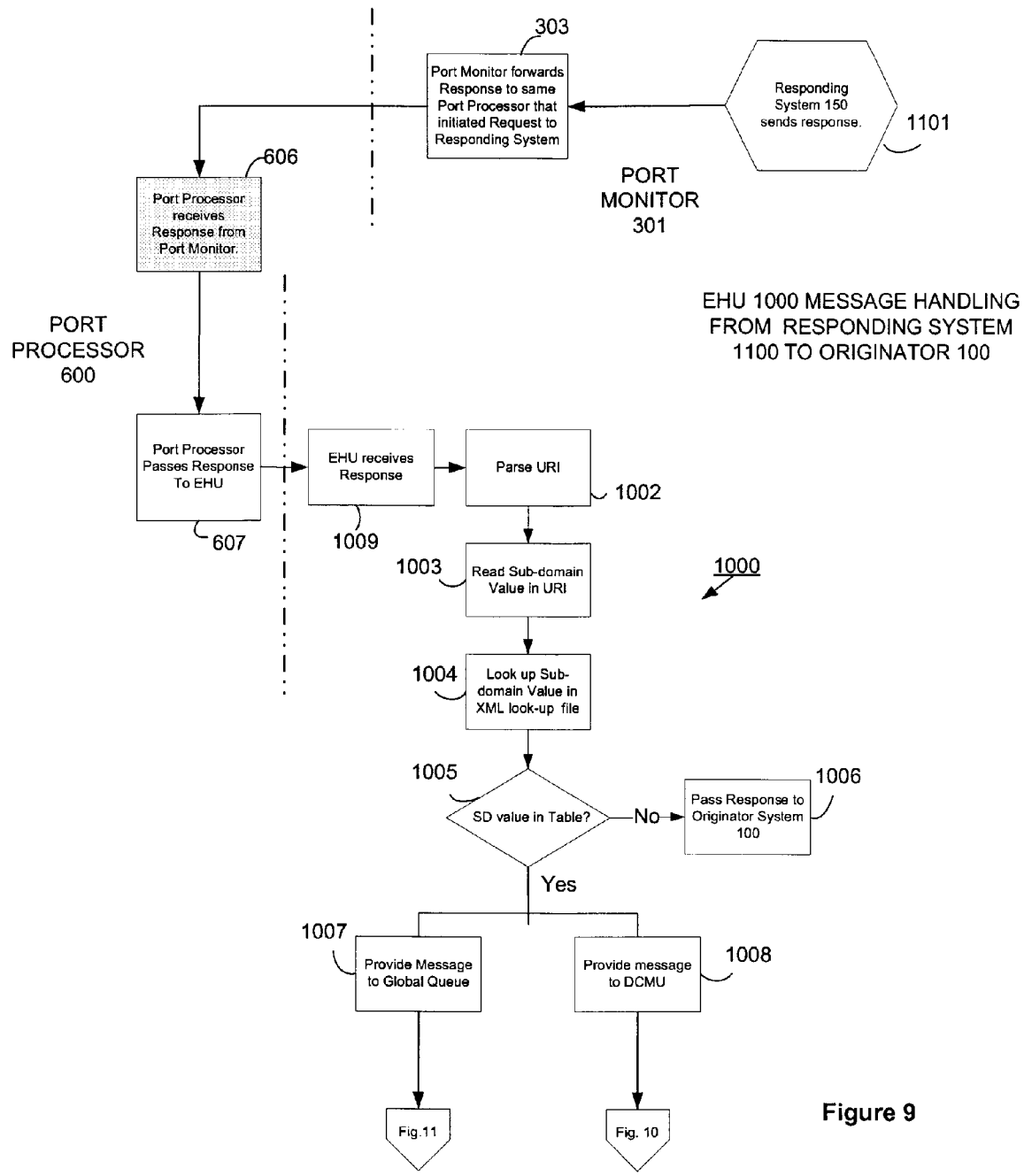
FIG. 9 is a flow chart illustrating event handling steps for a message transmitted from a responding system to an originator system according to an embodiment of the invention.

In a corresponding manner, a Message Input Unit 609 can receive from a Port Monitor 301 a Message 107 representing a response transmitted by a Responding System 1100 in response to a request from that same Port Processor 600 as shown in FIG. 9. This Port Processor passes the Message to the EHU 1000 as shown in step 607 in FIG. 9. In that case EHU 1000 preferably carries out steps illustrated in FIG. 9. EHU 1100 determines if a Sub-Domain 102 value in the Message 107 is in the Data Representation 601 as indicated in steps 1009, 1002 and 1003 of FIG. 9. EHU 1100 then provides the Message 107 to Global Cache 400 in step 1007 and to DCMU 900 in step 1008.

DCMU 400

Figure 10:
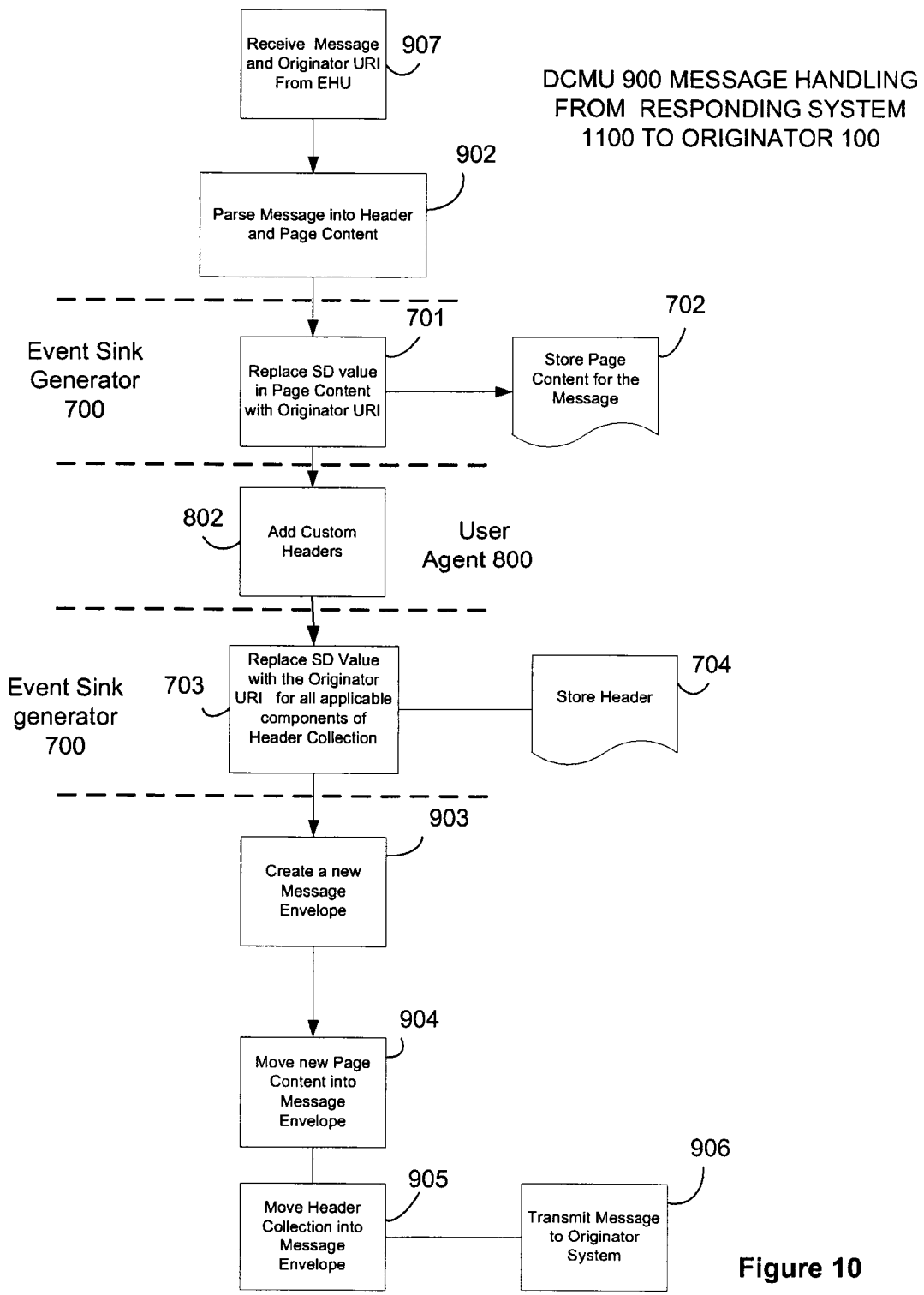
FIG. 10 is a flow chart illustrating dynamic content management steps for a message transmitted from a responding system to an originator system according to an embodiment of the invention.

DCMU 900 performs the general functions described below as shown in FIG. 10.

Content Retrieval. The DCMU 900 uses the content of the incoming Message 107 as well as the value of the incoming URI 103 to dynamically generate a request. This request is sent to the Responding System 1100 with the DCMU 900 emulating the Originating System 100. The response from the Responding Domain 1100 is captured and temporarily stored as an in-memory Message 107. The content of the response from the Responding System 1100 is used to generate a Message 107 to be sent back to the Originating System 100. Custom Headers 101, as shown in step 802 of FIG. 10, are inserted to identify this message in subsequent transmissions. The base URI 103 for all actionable components to be tracked (e.g., JavaScript, Form Post Addresses, Hyperlinks, etc.) is modified to point back to the Data Collection System 200 and port monitored by a Port Monitor 301. The Dynamic Response is sent back to the EHU 1000.

Figure 8:
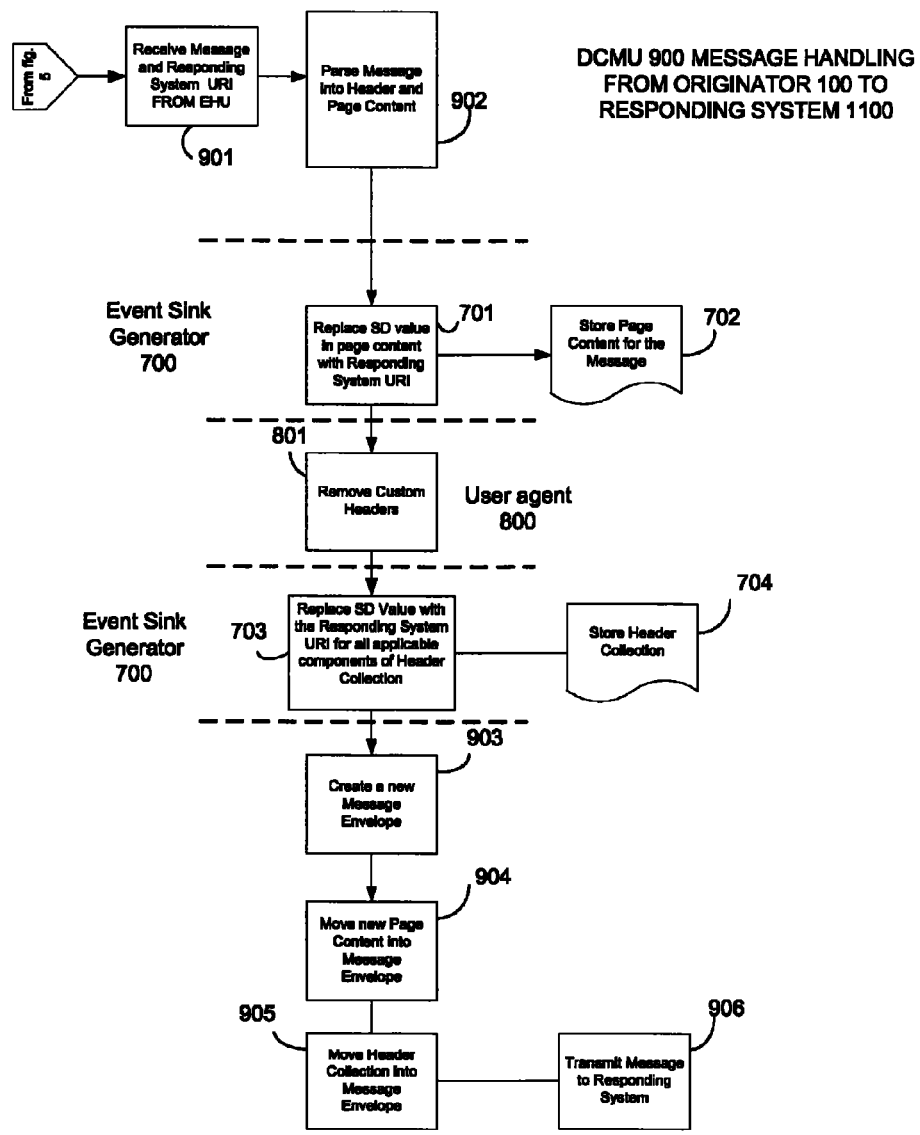
FIG. 8 is a flow chart illustrating dynamic content management steps for a message transmitted from an originator system to a responding system according to an embodiment of the invention.

FIG. 8 illustrates steps of a method carried out by DCMU 900 according to a preferred embodiment of the invention. As indicated at 901 of FIG. 8, DCMU 900 receives a Message 107 and a Responding System 1100 URI 103 from EHU 1000. DCMU 900 parses the Message 107 into a Header 101 portion and a Page Content 104 portion (indicated at step 902). The Header 101 and Page Content 104 portions are provided to ESG 700. ESG 700 replaces the Sub-Domain (SD) 102 value in the Page Content 104 with the Responding System 1100 URI 103 provided by EHU 1000 (indicated at step 701 of FIG. 8). The Message 107 is provided to the User Agent 800 as indicated in FIG. 6 at step 801. User agent 800 removes custom Headers 101 from the Header portion of the Message 107 and provides the Message 107 to back to the ESG 700 for further processing. ESG 700 replaces the Sub-Domain 102 values in the Header 101 collection with the Responding System 1100 URI 103 provided by EHU 1000.

DCMU 900 creates a new Message 107 envelope as indicated at 903 of FIG. 8. DCMU 900 moves the Page Content 104 provided by ESG 700 (at step 702) into the new Message 107 envelope (at step 904). DCMU 900 moves the Header 101 collection provided by ESG 700 (at step 704) into the new Message 107 envelope at step 905. The message is transmitted to a Responding System 1100 in the envelope provided by DCMU 900 in step 900.

FIG. 8 illustrates the DCMU 900 process for handling responses from a Responding System 1100. For responses, DCMU 900 acts as a client for the Responding System 1100. As illustrated in FIG. 8, the DCMU 900 process begins when DCMU 900 receives a Message 107 and an Originator System 100 URI 103 from EHU 1000 as shown in step 907. DCMU 900 parses the responses into a Header 101 collection portion and Page Content 104 portion (step 902). Preferably, all actionable components of the Page Content 104 portion are modified by DCMU 900 such that the base URI 103 points back to the Data Collection System 200 (step 7-1). Custom Headers 101 are added to the Header 101 collection in step 703 and a new Message 107, referred to herein as a "Dynamic Response Message" is created by DCMU. The Page Content 104 and Header 101 collection information provided in steps 702 and 704 are moved into the new Message 107 and the DCMU 900 provides the resulting Dynamic Response Message to the EHU 1000 (indicated at steps 903-906).

Event Sink Generator (ESG) 700

ESG 700 is coupled to DCMU 900. ESG 700 prepares the Dynamic Response to be properly handled by the system in the event of a response from the user. In one embodiment of the invention, ESG 700 performs the following functions.

Session Creation. If a Session does not already exist for this Dynamic Response, a new Globally Unique Identifier (GUID) is generated and added to the Header 101 Collection. The Session is queried from the Header 101 collection of the Message 107. The Session GUID is entered into the Header 101 collection for the Message 107. Message component collections that contain a DataTrendz™ Session Header value are called "Monitored Responses". The Monitored Response is then sent back to EHU 1000.

Global Queue 400

Figure 11:
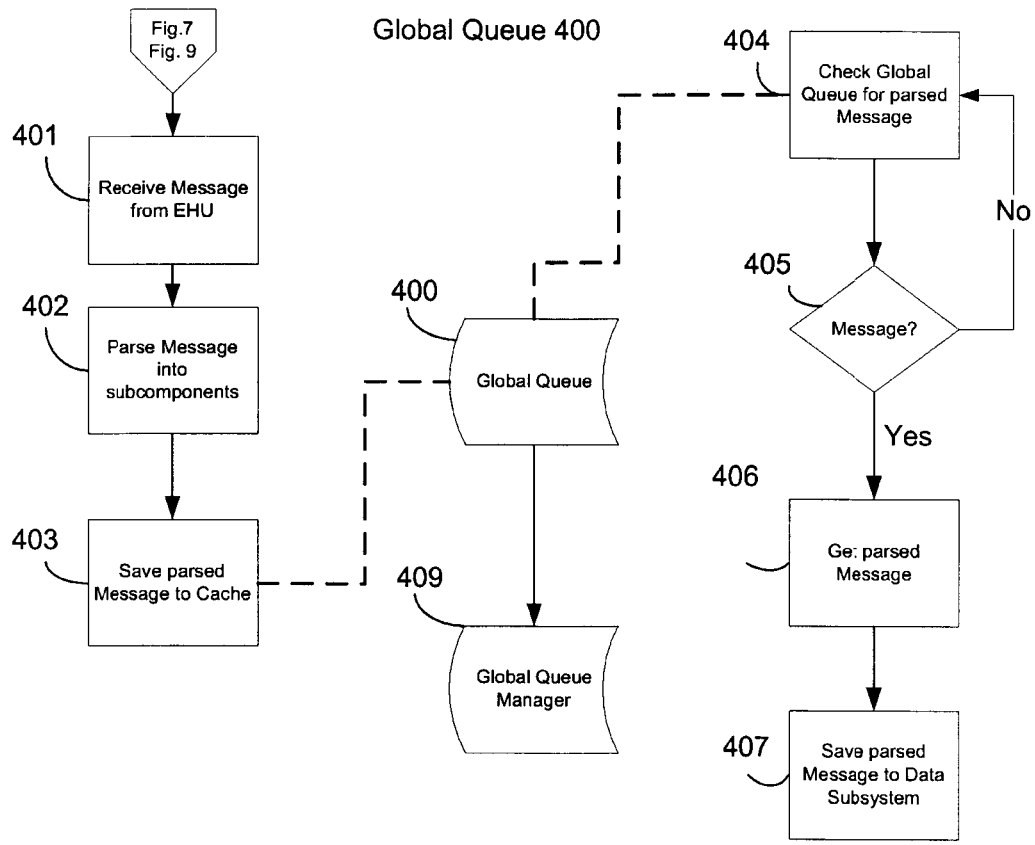
FIG. 11 is a flow chart illustrating steps for storing tracking information according to an embodiment of the invention.

The Global Queue 400 stores information about a given request into an in-memory location that is managed and persisted through a Global Queue Manager 409 as shown in FIG. 11. The Global Queue can consist of one or more servers either processing individually or in a clustered environment. Separate from the physical implementation of the Global Queue Manager, that Global Queue Manager can manage one or more Global Queues 400 whether those queues reside on the same or separate physical machines.

The Global Queue Interface 408 provides a means for an EHU 1000 process to place new Messages 107 onto the queue in a fire-and-forget manner. In one embodiment, there can be a single Global Queue 400 for each EHU 1000 process and, in another embodiment; Global Queues 400 and EHU 1000 processes can share a many-to-many relationship.

In one embodiment of the invention, the Global Cache 400 is a shared system resource accessed by two or more processes. In a preferred embodiment, the Global Cache 400 is an asynchronous queuing/caching mechanism used to pass data. All of the embodiments both described in this section and surmised from this review are considered to fall within the scope of this invention.

The Global Manager 409 is responsible for monitoring the various queue storage processes within a given Global Queue 400. If any one storage process becomes slow or unresponsive, the Global Queue Manager is responsible for initiating a new queue storage process while gracefully terminating the problematic storage process. This concept is referred to as spinning up and spinning down processes.

As shown in FIG. 11, the Global Queue processes incoming messages using the following steps: Session Determination. The Header 101 collection is queried to determine that a Session exists. If a Session does not already exist for this message, a new Session GUID is generated. The Session GUID is entered into the Header 101 collection for the Message 107. Page Storage An in-memory configuration file is then queried to determine whether or not to store all of the contents of the page. If the page needs to be stored, the context-dependent information (Header Collection, Page Content, Form Content, etc. . . . ) are entered into the database along with the Session ID. Action Storage. The actual action (e.g., a GET or POST command for HTTP) is also stored along with the Session ID in the database. All events captured on in the main content are also recorded into the database at this time—including all pertinent tracking information.

FIG. 11 illustrates the operations of the Global Queue 400 according to an embodiment of the invention. At 401 a Message 107 is received from EHU 900. The Message 107 is parsed into subcomponents (step 402). The parsed subcomponents are sent to the Global Cache 400 in step 403 and that Global Cache 400 is checked for stored parsed messages in steps 404 and 405. When a parsed Message 107 is found in the Global Cache 400, the parsed Message 107 is retrieved from the Global Cache 400 and written into an Archiver server 501.

User Agent Unit 600

User Agent 800 is manually created by developing a command that points to the Data Collection System 200. It is preferred that the URI 103 in the command contain a valid Responding System 1100 Sub-Domain 102 value in the base domain section. Outside of this rule, User Agent unit 800 is flexible. User Agent unit 800 has a wide variety of implementations. For example, user agent 800 can be implemented in SEM and Banner Ads, hyperlinks on websites, emails and submissions on various sites to name but a few possible implementations. Further, user agent 800 can take the form of binary, TCP, communication protocols and even wireless/cellular transmission addresses as warranted by the implemented network.

Data Subsystem 500

Figure 12:
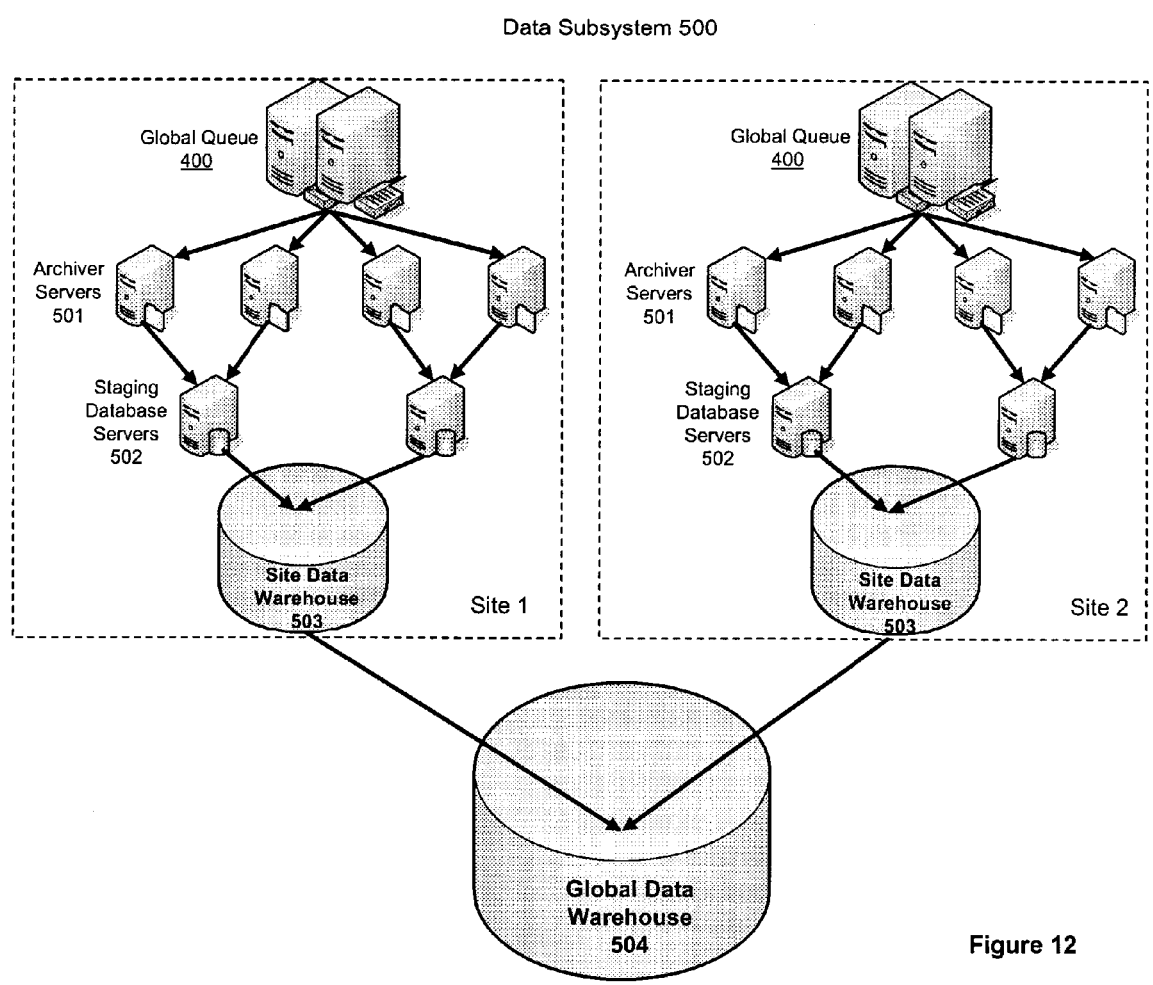
FIG. 12 is a block diagram providing one possible configuration of the data subsystem according to an embodiment of the invention.

The Data Subsystem 500 is utilized to capture, store, aggregate and analyze data capture by the Data Collection System 200. The Data Subsystem utilizing a tributary data collection model wherein one or more Archiver Servers 501 are utilized to rapidly transfer Messages 107 from the Global Queue 400 to a more permanent storage mechanism as is shown in FIG. 12.

In a preferred embodiment, the Archiver Server 501 utilizes a relational data store in order to store information. In another embodiment, information is written into binary file formats and persisted onto disk. The main purpose of the Archiver Servers 501 is to move in-memory Global Queue 400 messages to a more resilient storage medium.

On a system-defined interval, the Staging Database Server 502 pulls information from one or more Archiver Servers 501 for the purpose of loading that data into a Site Data Warehouse or DataMart. In one embodiment, the Archiver Server 501 employs a many-to-one relationship with the Staging Database Server 502. In a preferred embodiment the Archiver Server 501 employs a direct one-to-one relationship with the Staging Database Server 502 and in yet another embodiment the Archiver Server 501 employs a one-to-many relationship with a Staging Database Server 502.

Further, in a given embodiment, the Archiver 501 and Staging Database 502 servers can reside on the same physical device utilizing the vendor software platform. In another embodiment the Archiver 501 and Staging Database 502 servers can reside on separate physical devices utilizing the same vendor software. In yet another embodiment, the Archiver 501 and Staging Database 502 servers can employ different vendor software platforms irrespective of their physical location. All of the embodiments both described in this section and surmised from this review are considered to fall within the scope of this invention.

Similarly the Site Data Warehouse 503 can reside either on the same or separate physical devices and it can employ the same of different vendor software platforms from the Archiver 501 and Staging Database 502 servers. The Site Data Warehouse 503 stores information in an advantageous manner for analyzing traffic in a variety of manners.

Optionally, in cases of multi-site operations, a Global Data Warehouse 504 can be utilized to consolidate data across various sites. Similarly the Global Data Warehouse 503 can reside either on the same or separate physical devices and it can employ the same of different vendor software platforms from the Archiver 501, Staging Database 502 and Site Data Warehouse 503 servers.

Thus the Data Collection System 200 implements a system for collecting information transmitted over a network. The Data Collection System 200 communicates with an Originating System 100 over a network to receive a Message 107 having a URI 103 from the Originating System 100 acting in the role of an endpoint server. The Data Collection System 200 determines a Responding System 1100 URI 102 for the Message 107 based upon the incoming Originator System 100 URI 107. The Data Collection System 200 is configured to analyze the contents of the Message 107 and to generate a subsequent Message 107 based on the results of the analysis of the initial Message 107. The Data Collection System 200 stores the context-dependent components of the Originator System 100 Message 107 in a process utilizing a Global Queue 400 while transmitting a subsequent Message 107 to the Responding System 1100 URI 103 acting in the role of an Originating System.

Contextual Data

There are three main components to contextual data: Structure, Interactions and Time.

Structure is related to the intra- and inter-component definitions found on a given network location. Components can include, but are not limited to, web pages, web services, remotely-accessed software resources and publicly-available sets of data. Structure includes, but is not limited to, how components are linked together as would be found in a web site map or system diagram. Structure also includes how a given component is constructed (e.g. as in the structure of a web page or the structure of a set of API calls) as well as how the content from a given component is presented to a user. Structure, in essence, includes everything sent from a given server to a user.

Interactions are generally denoted as anything derived from a client action which is either directly or indirectly tracked through the DataTrendz™ invention. In one embodiment a user can send a request or response to a server in which case all information passes through the DataTrendz™ architecture and is subsequently captured as described. In another embodiment, asynchronous callback mechanisms, client-side scripts such as AJAX or JavaScript, constructs such as ActiveX controls or Java Applets or even downloaded components such as, toolbars and plug-ins, can be used to send information about user interactions to the DataTrendz™ system. This list does not include all possible options rather it is meant to represent a sampling of some of the possible alternatives.

Time refers to the ability of the DataTrendz™ invention to track Structure and Interactions over time. This enables a moving view of user activity and enables the ability to obtain patterns of both user behavior and web site responses.

By enabling the capture, storage and analysis of this type of data, DataTrendz™ provides the ability to view data in context to either a server's responses or to various time-dependent measures.

Industry Application

The DataTrendz™ invention finds utility through its various embodiments in a wide range of industries. This section will delve into some of those industries, highlighting the enhancements obtained through this invention. This list is not considered to be comprehensive rather it is meant to provide a representative sampling of the application of this invention.

DataTrendz™ removes some of the more significant obstacles that impede many current tracking solutions. DataTrendz™ provides the ability to track user interactions without requiring code on the Responding Systems. DataTrendz™ also captures never before acquired data such as contextual data and actual form submission values in relation to site structure. Finally DataTrendz™ can track users across domains without requiring special cookies on the Originating Systems. From Internet/Extranet-based website tracking to Intranet-based Enterprise Content Resource tracking, DataTrendz™ offers significantly enhanced capabilities to track user interactions.

Click fraud loosely defines an industry devoted to analyzing patterns of activity in an attempt to determine fraudulent activities. Examples of click fraud include, but are not limited to automated (BOT) programs, scripted click pattern activities and hacker service attacks. Click fraud analyses suffer from a gap between content crawlers that obtain static, structural data of network-enabled sites and current tracking solutions that capture user actions. DataTrendz™ provides the ability to overlay user interactions on top of network-enabled site structure and enables new data algorithmic approaches to determine fraudulent activities. Data Mining will be covered in more detail in the next section.

Behavioral Targeting is the name applied to those solution providers that attempt to provide targeted commercial content to users as those users traverse different network sites within a monitored group of sites. For example, if a user traversed a given network of car dealership websites, this approach would eventually determine that the user was interested in a vehicle and ads displaying car option would be provided. The main challenge with behavioral targeting is that it requires a system to track a user across network sites. Prior to DataTrendz™ this meant either using third-party cookies, which most browsers disable by default, or vendors have to try to correlate user information from separately collected data. The ability of DataTrendz™ to actually follow users across network sites enables real-time behavioral targeting not available in the current market.

Search Engine Optimization (SEO) companies attempt to determine various means of moving a client's natural search results as high as possible utilizing things like external linking, directory placements, etc. . . . This is all in an effort to determine what search engines deem the most valuable at any moment in time. The main detraction of these efforts is the indirect means of determining cause and effect. These solutions are capable of obtaining user interactions but they cannot simultaneously obtain site structure. For example, a given solution might be capable of determining that a user visited a given page but they are unable to determine the exact content on that page. Since DataTrendz™ obtains contextual data, SEO can occur in real time with different possible avenues being explored in successive iterations.

Search Engine Marketing (SEM) describes an industry devoted to the placement of relevant paid advertisements with natural search results at the keyword level. One of the goals of SEM companies is increase sales or leads for target websites. There are numerous limitations in most SEM offerings including an inability to directly report on user content (i.e. form submission data) and an inability to directly tie search engine content into resultant visitor actions. DataTrendz™ is situated between a search engine and a target website and is able to tie the user interactions in with the search engine campaigns. An Internet-based embodiment of this invention is a useful fit for search engines as DataTrendz™ provides significant contextual information for SEM companies.

The collection of such large volumes of ongoing contextual information also provides a single repository of market information. By utilizing innovative data mining algorithms, DataTrendz™ will be able to provide Market Analysis and Forecasting capabilities previously unobtainable.

Affiliate marketing describes the practice of merchants enabling other online marketers to advertise on the behalf of that merchant. Affiliate marketing is built upon the ability to track user actions across a wide range of merchant network sites in order to verify purchases and other user actions. Historically this has been an extremely difficult process that requires lengthy ongoing efforts by both affiliate networks and merchants. DataTrendz™ removes many of these obstacles by removing the need to place code on each merchant's site. Further, since most affiliate marketing networks pass traffic through a series of HTTP redirection processes, DataTrendz™ will actually decrease network visibility while increasing stability and tracking capabilities by eliminating this redirection with a redundant network solution.

Data Mining

Once the contextual data has been collected by the system, meaningful analysis is performed so as to realize additional business and strategic insight. This type of analysis is often referred to as distributed data mining. Distributed data mining techniques are currently applied to a wide variety of data types. Although one skilled in the art may choose to utilize their own preferred implementation methodology, one preferred approach is to first overlay the functional components of the contextual data on top of the structural elements in order to develop, visualize and better understand the context and potential business or other objectives that can be supported by the data. Once this process is complete, the structured, functional data is stored along a temporal axis utilizing time-slicing algorithms.

With this novel set of data properly joined and stored, proven and well known theoretical approaches in data mining can be used to define usage patterns, sequence patterns, patterns of activation, determine new or growing points of impact and to derive market variability and ultimately future forecasts for some or all of the aforementioned.

Using these new patterns, secondary analyses reveal additional points of interest by measuring periodic fluctuations in activation against modeled outcomes and weighted points of impact. These periodic fluctuations can be comprised of any time period including, but not limited to, time-related periodicity, regional characteristics, network location information and/or user attributes. Interactions can include any combination of these fluctuations with any single, or multiplicity, of data attributes ascribed to the data. For example, a possible combination of interest could be monthly fluctuations of female usage in the North East United States for purchasing household goods.

Utilizing these secondary analyses, further patterns of activation emerge that underlie such efforts such as Search Engine Optimization (e.g. what characteristics of the content makes a web site more effective) or Enterprise Content Management (e.g. when content is organized using a given taxonomy upper management finds the content more or less effective). Furthermore, deviations from standard patterns of activation enable the development of impact analyses which can culminate in such efforts such as Click Fraud Analysis.

Active Cookies

One of the more interesting innovations underlying this system focuses on resolving the issue of tracking visitors across multiple visits to target network sites. In order to enable the ability to track individuals across days, weeks, months and years, one embodiment of this invention utilizes the concept of an Active Cookie to handle subsequent visits to a given network site.

An Active Cookie is a small utility which can be manually downloaded, automatically installed or some combination therein onto a user's computer. This utility leverages an internal list of user-visited network sites to be tracked while monitoring network activity by the user.

Whenever a user re-visits a given network site, this utility automatically redirects that user to the DataTrendz™ system wherein tracking is re-initialized. In a preferred embodiment, other than this automatic redirecting function, the Active Cookie does not interact with the user's computer nor is it capable of any other action.

In one embodiment, this utility can take the form of a browser plug-in, ActiveX or Java Applet which monitors all network traffic for a given web browser. These objects are considered to be examples and not restrictive. In another embodiment DataTrendz™ would send an executable file as part of the response to an Originating System. This executable would be embedded as an image or some other file format that would avoid security issues with the user. This executable would then embed itself on the user computer in a manner similar to current cookie technology and monitor traffic accordingly. These are two examples of how Active Cookies might be implemented and not provided for example only. They are not considered to be an exhaustive list of possible implementation alternatives and all other alternatives are considered to be within the scope of the present invention.

While preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system for obtaining and storing information transmitted over a network, the network comprising a first network location configured to transmit information to a second network location, the system comprising:
   an intermediary network location logically situated between the first network location and the second network location, the intermediary location configured to:
   receive a first transmission from the first network location,
   terminate the first transmission at the intermediary network,
   generate a second transmission including at least a portion of the content of the first transmission received from the first network location,
   send the second transmission to the second network location,
   receive a third transmission from the second network location,
   terminate the third transmission at the intermediary network,
   generate a fourth transmission including at least a portion of the content of the third transmission received from the second network location,
   send the fourth transmission to the first network location;
   wherein the intermediary network location is further configured to store the transmissions received from both the first network location and the second network location into a logical memory location; and
   wherein the intermediary network location is further configured to:
   monitor a list of network locations;
   compare the second network location to the list of network locations monitored by the intermediary network location; and
   forward the transmission from the first network location to the second network location without modifying, tracking or storing the transmission when the second network location is not on the list of network locations monitored by the intermediary network location.

2. The system of claim 1 wherein the intermediary network location is configured to act on behalf of the first network location when sending transmissions to the second network location.

3. The system of claim 1 wherein the intermediary network location is configured to act on behalf of the second network location when sending transmissions to the first network location.

4. The system of claim 1 wherein at least one of said transmissions includes a non-visible component and where a tracking value is placed in said nonvisible component in order to track a series of transmissions.

5. The system of claim 1 wherein the fourth transmission from the intermediate network location to the first network location includes active content and where at least some portion of the active content is modified to direct subsequent responses back to the intermediate network location.

6. The system of claim 5 where the active content is one or more hyperlinks.

7. The system of claim 5 where the active content is an embedded component.

8. The system of claim 6 where the embedded component is one of Flash, or ActiveX or Java Applets.

9. The system of claim 6 where the embedded component is a clientside script.

10. The system of claim 9 where the client-side script is selected from VBScript or JavaScript.

11. The system of claim 5 wherein the first transmission is directed from the first network location to the intermediate network location through a distinct URI value.

12. The system of claim 11 wherein the URI value contains a unique value enabling the intermediate network location to determine the second network location.

13. The system of claim 12 wherein the unique value is placed in the URI in the form of a name-value pair.

14. The system of claim 1 wherein the first transmission is directed from the first network location to the intermediate network location utilizing DNS entries.

15. The system of claim 1 wherein unique information from the first network location is used to determine the second network location wherein the first transmission from the first network location are automatically sent to the intermediate network location.

16. The system of claim 15 wherein the unique information from the first network location is the IP address of the first network location.

17. The system of claim 15 wherein the unique information from the first network location is the MAC address of the first network location.

18. The system of claim 1, wherein the intermediary network location is further configured to store the first transmission received from the first network location and the third transmission received from the second network location into a logical memory location.

19. The system of claim 18 wherein the logical memory location is a global queue.

20. The system of claim 19 wherein the information in the memory location is persisted to a more permanent storage medium.

21. The system of claim 20 wherein said storage medium is selected from one of either a file on a file system or a record in a database.

* * * * *